July 17, 1962 W. H. TANKE 3,044,712
LIQUID DISTRIBUTOR FOR AGRICULTURAL IMPLEMENTS
Filed April 4, 1960 2 Sheets-Sheet 1
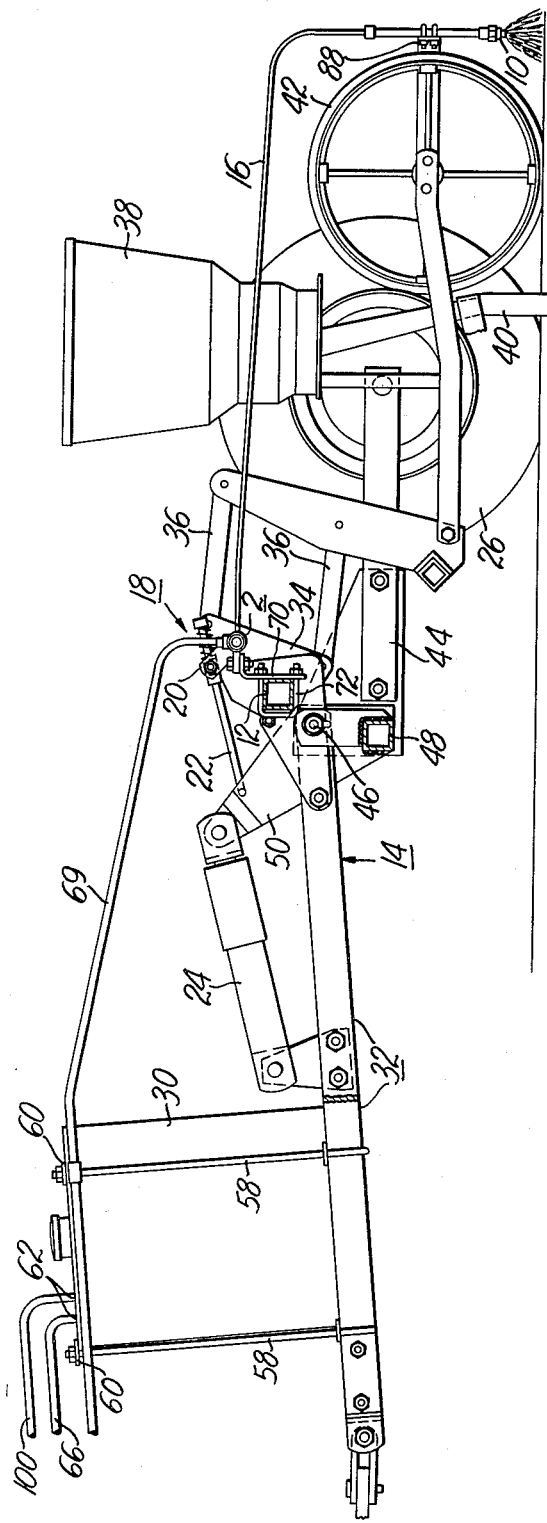
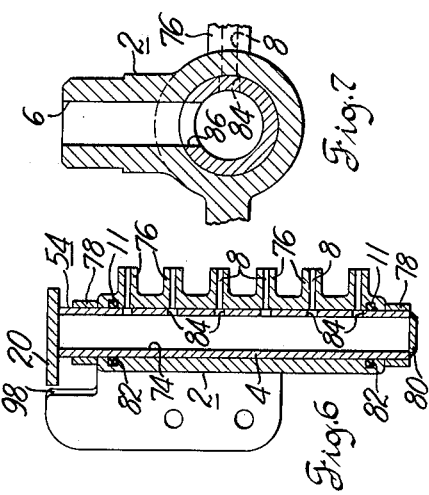
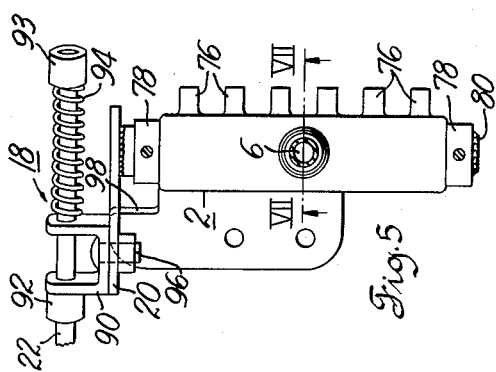
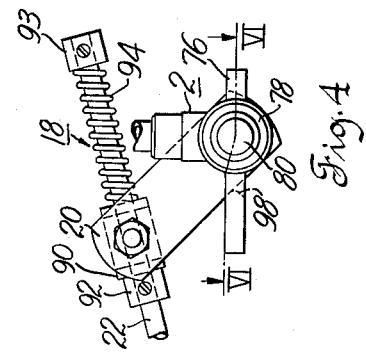
Inventor
Willard H. Tanke
By Howard B. Schechman
Attorney July 17, 1962     W. H. TANKE     3,044,712
LIQUID DISTRIBUTOR FOR AGRICULTURAL IMPLEMENTS
Filed April 4, 1960                         2 Sheets-Sheet 2
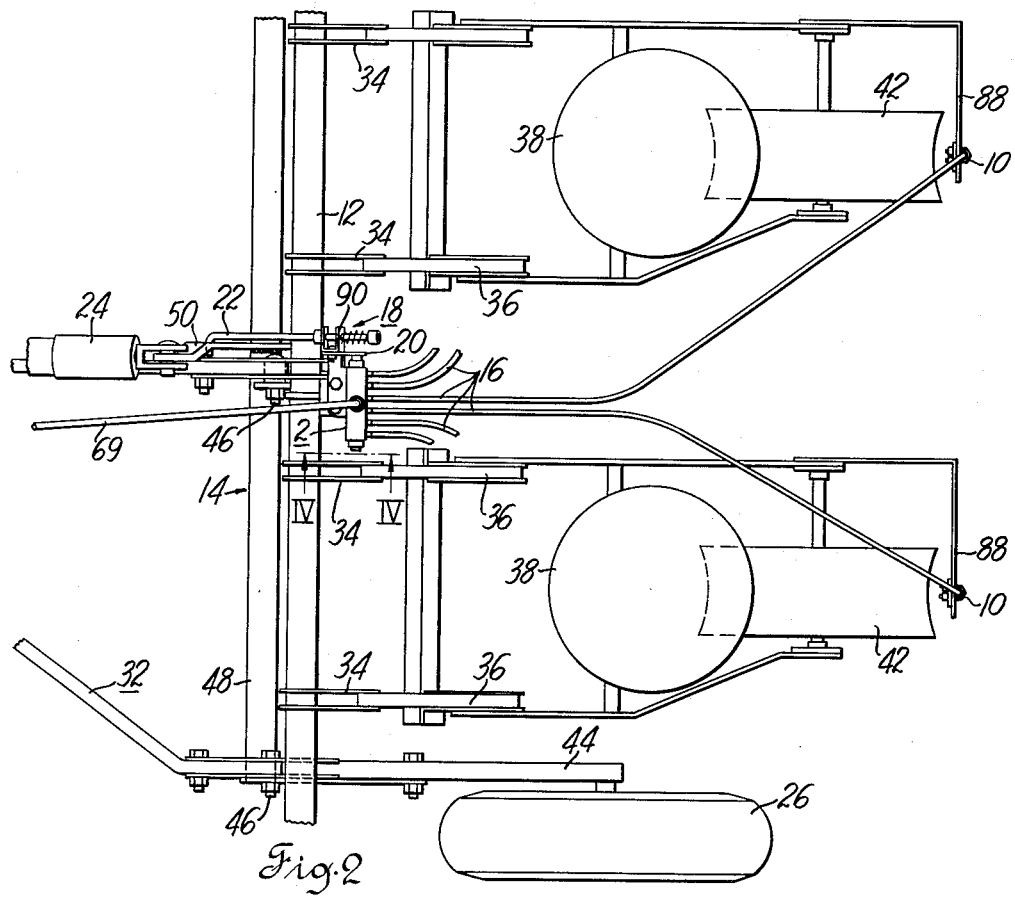
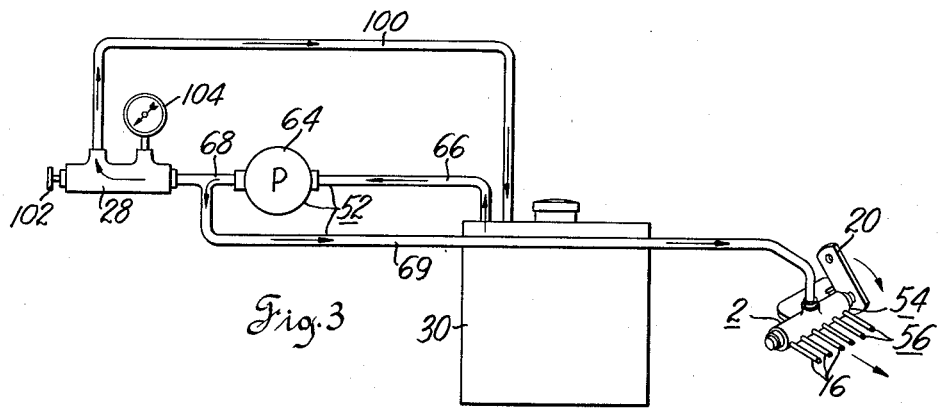
Inventor
Willard H. Tanke
By Howard B. Scheckman
Attorney

United States Patent Office 3,044,712
Patented July 17, 1962

3,044,712
LIQUID DISTRIBUTOR FOR AGRICULTURAL
IMPLEMENTS
Willard H. Tanke, La Crosse, Wis., assignor to Allis-
Chalmers Manufacturing Company, Milwaukee, Wis.
Filed Apr. 4, 1960, Ser. No. 19,757
8 Claims. (Cl. 239—127)

This invention relates to agriculture and more particularly to agricultural apparatus for applying fluids to soils in which crops are grown.

It is well known to mount spray attachments on agricultural tractors or implements for distributing fluid chemical fertilizers or weed killers.

These systems for distributing fluid, however, present certain problems.

One problem is that the conduits, valves, and manifolds that are used in these distribution systems act like reservoirs. When the system operates they fill with fluid. When the flow of fluid is cut off, this stored up fluid drains out the spray nozzles and is wasted. This waste of fluid becomes appreciable after awhile. And, since chemical fertilizers and weed killers are expensive, this loss is costly.

These systems have other problems. They use complicated valve arrangements to shut off the flow of fluid. They are difficult to connect for automatic operation. And, due to a lack of constant agitation of the fluid in the supply reservoir, the various chemicals separate or settle.

It is an object of this invention to provide an agricultural apparatus for applying fluid to the soil, that has a small reservoir capacity, so there will be less loss of fluid due to drainage when the flow of fluid is cut off.

It is another object of this invention to provide an agricultural apparatus for aplying fluid to the soil, that is simply constructed and can be easily adapted for automatic operation.

It is another object of this invention to provide an agricultural apparatus for applying fluid to the soil, that continuously agitates the supply of fluid in the supply reservoir to prevent settling or separation.

Other objects and advantages will appear from the following description considered in conjunction with the attached drawings, in which:

FIG. 1 is a side view of an agricultural apparatus with portions removed for illustration, showing the spray attachment including the control means;

FIG. 2 is a top view of FIG. 1 with certain portions omitted, showing the control means, manifold, and some conduits connected to nozzles;

FIG. 3 is a schematic illustration of the fluid distribution system;

FIG. 4 is a view of a portion of FIG. 2 taken in the direction of arrows IV—IV showing the control means;

FIG. 5 is a plan view of FIG. 4 showing the control means and manifold;

FIG. 6 is a sectional view of FIG. 4 taken in the direction of arrows VI—VI showing the valve means; and FIG. 7 is a sectional view of FIG. 5 taken in the direction of arrows VII—VII showing the valve means and manifold.

Invention Generally

Referring to FIGS. 6 and 7 the invention contemplates providing manifold 2 with a rotatable internal tubular member 4. The tubular member can be rotated to open or close entrance port 6 (FIG. 7) and exit ports 8 in the manifold to simultaneously cut off or connect the flow of fluid to spray nozzles 10 (FIGS. 1 and 2). When the flow of fluid is cut off, the fluid in the manifold is trapped so it cannot drain out. Manifold 2 (FIG. 1) is carried by tool bar frame 12 of planter implement 14, so that only relatively short supply conduits 16 lead to spray nozzles 10. The only elements that can drain are short supply conduits 16. As a result there is less fluid lost due to drainage when the system is shut off.

The invention also embodies a control means (indicated generally by arrow 18) for automatically rotating tubular member 4 in response to raising or lowering of tool bar 12, to cut off or connect the flow of fluid to the spray nozzles. To accomplish this, tubular member 4 is provided with an actuating arm 20 that is rotated by rod 22, moved in response to ram 24 raising or lowering transport wheels 26.

Finally, referring to FIG. 3 the invention contemplates providing a bypass valve 28 in the fluid distribution system. The bypass valve is constructed to automatically and continuously bypass part of the fluid, fed to manifold 2 during the spraying operation, back to reservoir 30 to prevent settling or separation of the chemicals.

Invention Specifically

Refering to FIG. 1 there is disclosed an agricultural apparatus in the form of a planter implement 14. The planter is adapted to be pulled by a tractor (not shown). The planter is provided with a main frame or drawbar member 32, and a plurality of secondary frames 34 connected to a tool bar 12 fixed to main frame 32. Each secondary frame 34 supports parallel links 36, 36. A pair of secondary frames cooperate to support a hopper 38, dispensing equipment 40, press wheel 42 and spray nozzle 10.

Main frame 32 is supported on transport wheels 26 which can be raised and lowered vertically relative to the main frame.

Transport wheels 26 are carried on arms 44 pivotally connected at 46 to the main frame 32. Arms 44 are connected to transverse bar 48. Transverse bar 48 carries ram arm 50, and ram 24 is connected to ram arm 50.

To lower planter frame 14 for planting, ram 24 is retracted and ram arm 50 rotated counterclockwise (FIG. 1) about pivot point 46. This raises transport wheels 26 vertically relative to main frame 32. To raise main frame 32 for transport, ram 24 is extended to reverse the procedure.

Distribution System

The agricultural apparatus includes a distribution system for applying fluid to the soil.

The distribution system is shown schematically in FIG. 3. It includes reservoir 30; manifold 2; means 52 for suplying fluid from reservoir 30 to manifold 2; valve means 54 carried in the manifold to control flow through the manifold; conduit means 56 connecting manifold 2 to spray nozzles 10 (FIG. 2); and bypass valve 28.

Reservoir

Referring to FIG. 1 the supply tank or reservoir 30 is mounted on the forward portion of main frame 32. The tank is adapted to contain fluid such as for example, liquid chemical weed killer. The tank is secured to main frame 32 by means in the form of bolts 58 and clamp members 60. The top of the tank is provided with two conduit openings 62, 62 and an opening (not shown) for filling the supply tank.

Supply Means

The means for supplying fluid to the manifold comprises a pump 64 and conduits 66, 68, and 69. The pump may be driven by the tractor power take-off shaft (not shown) as is conventional in the art. Conduit 66 connects reservoir 30 with the suction side of the pump, and conduits 68, 69 connect the delivery side of the pump with the manifold 2.

Manifold and Valve Means

Manifold 2 is connected to main frame tool bar 12. It is rigidly secured by means in the form of an angle bracket 70 and U-bolt 72.

Referring to FIGS. 6 and 7, the manifold is cylindrical and has an internal transverse bore portion 74, it has a large intake port 6, to which conduit 69 is connected, and a series of smaller, equally spaced outwardly extending projections 76 along the transverse length of the manifold. These projections contain exit or outlet ports 8.

The manifold includes valve means 54 operative to either close or open the ports in the manifold to cut off or connect the flow of fluid to spray nozzles 10.

The valve means includes elongated tubular member 4, set collars 78, 78, plug 80, and arm 20. The bore portion of manifold 2 rotatably receives tubular member 4. An annular groove 82 is formed on each end of the manifold to receive an O-ring 11 to maintain fluid tight connection with rotatable tubular member 4.

Tubular member 4 is held within manifold 2 by means of set collars 78, 78 located on each of its projecting ends.

Both ends of tubular member 4 are sealed. In the embodiment shown, means in the form of plug 80 and arm 20 are provided to close the ends of tubular member 4. Plug 80 is secured to one end of the tube by means such as welding, and actuating arm 20 is secured to the other end by means such as welding.

Tubular member 4 is provided with a series of spaced passages 84 that correspond to ports 8 in manifold 2, and a large single inlet passage 86 that corresponds to port 6 in manifold 2. When tubular member 4 is rotated to the correct position, passages 84, 86 will all simultaneously align with ports 6 and 8 in manifold 2. In this manner, fluid pressure will be constantly available at all of the ports in the manifold. And, when the ports open, all of the spray nozzles will be instantly and uniformly supplied with fluid.

Conduit Means

Conduit means 56 (FIG. 3) connects the manifold to the spray nozzles. It comprises a plurality of small short supply conduits 16 that are clamped to manifold projections 76. These supply conduits extend rearwardly and their ends are provided with spray nozzles 10 that are clamped to supports 88 (FIGS. 1 and 2) connected to the planter.

Control Means

Control means are provided to rotate arm 20 and in turn tubular member 4 to automatically and simultaneously open and close the ports in manifold 2 in response to raising or lowering of planter frame 32. The control means comprises rod 22, trunnion 90, set collars 92, 93 and compression spring 94.

Rod 22 is pivotally connected to ram arm 50 and extends rearwardly therefrom with the free end being slidably received in a trunnion 90 (FIG. 5). Trunnion 90 is pivotally connected to actuating arm 20 by means of bolt 96. Set collars 92, 93 are adjustably mounted on rod 22 on either side of trunnion 90. Compression spring 94 surrounds rod 22 and is positioned between trunnion 90 and rear set collar 93 located on the free end of rod 22.

In lowering the planter into planting position, planter ram arm 50 will pivot forwardly (counterclockwise, FIG. 1) thereby causing rod 22, set collar 93, and spring 94, to rotate arm 20 and tubular member 4 in the same direction to open the ports 6 and 8 in manifold 2.

When raising the planter, planter ram arm 50 will pivot rearwardly (clockwise, FIG. 1) thereby causing forward set collar 92 to rotate arm 20 and tubular member 4 in the same direction to close ports 6 and 8 in the manifold 2.

When arm 20 is rotated counterclockwise (FIGS. 1 and 4) it engages a projection 98 provided on manifold 2. This position of tubular member 4 is adjusted so that when arm 20 engages projection 98, passages 84, 86 in tubular member 4 will be in alignment with ports 8 and 6 in manifold 2 when the planter is lowered into its planting position. Spring 94 provides a resilient connection that will yield when arm 20 engages projection 98 to prevent damage of any of the elements.

Bypass Valve

Means in the form of bypass valve 28 is connected to conduit 68 to continuously and automatically bypass fluid through conduit 100 back to supply reservoir 30 to keep the fluid in the reservoir agitated.

Valve 28 is of conventional type wherein a spring urged ball (not shown) is urged against a seat (not shown). A handle 102 is provided to adjust the spring pressure so the valve can be set to bypass a predetermined portion of the fluid to provide the desired amount of agitation and to control spraying pressure. The valve includes a pressure gauge 104 to indicate the pressure in conduit 68.

When the manifold is closed to fluid flow, the increased pressure in conduit 68 will move the spring urged ball further away from its seat and all the fluid will bypass manifold 2 through conduit 68, bypass valve 28, conduit 100 back to the reservoir 30. With this arrangement pump 64 need not be turned off when not spraying.

Operation

The distribution system is placed in operation automatically. This happens when the main frame 32 is lowered to planting position by raising transport wheels 26 relative to the main frame. Ram 24 rotates ram arm 50 counterclockwise (FIG. 1) and raises the transport wheels. Ram arm 50 in turn moves rod 22 and set collar 93 against spring 94 and rotates arm 20 counterclockwise (FIG. 1) until it hits projection 98, at which point, passages 84, 86 in tubular member 4 will be in alignment with ports 6 and 8 in manifold 2. Fluid will then flow through manifold 2, through supply conduits 16 and out spray nozzles 10.

The system will shut off automatically when main frame 32 is raised to transport position. Ram 24 rotates ram arm 50 clockwise to lower transport wheels 26 relative to planter frame 32. Ram arm 50 in turn moves rod 20 and set collar 92 to rotate arm 22 and tubular member 4 clockwise to close ports 6 and 8 in the manifold to simultaneously and individually cut off the supply of fluid from the reservoir to each individual spray nozzle.

In Summary

Some of the advantages of this invention are:

(1) A manifold that can be closed to prevent fluid from draining out of the manifold.

(2) A manifold that can be carried on the implement frame close to the nozzles so shorter supply conduits can be used to decrease drainage.

(3) A manifold that can be easily connected for automatic operation.

(4) An arrangement to provide continuous and automatic agitation of the fluid in the supply reservoir to prevent settling and separation of the chemicals.

While the invention is shown applied to an agricultural apparatus of the pull type, it will be apparent to those skilled in the art that the invention can be applied to an implement of the fully or semimounted type. The fluid supply tank could be carried by the tractor, and the control means operated either automatically by, for example, raising or lowering of the tractor lift arms, or manually by the operator.

Although a single embodiment of the present invention has been illustrated and described, it will be apparent to one skilled in the art that various changes and modifications may be made therein without departing from the invention as defined in the claims.

What is claimed is:

1. In an agricultural apparatus for applying fluid to the soil, the combination comprising: a reservoir containing fluid; a tubular manifold containing a main entrance port and a plurality of exit ports in the side of said manifold; means for supplying fluid from said reservoir to said main entrance port; a plurality of nozzles; conduit means connecting said nozzles to said exit ports; said manifold including an elongated tubular member having ends and means closing said ends, said tubular member being rotatably supported within said tubular manifold, said tubular member containing a plurality of passages in the side of said tubular member, said tubular member being rotatable to simultaneously align said passages with said ports and permit passage of fluid through said manifold or rotatable to block said entrance port and simultaneously block said exit ports to close all of said ports in said manifold and cut off the flow of fluid into said manifold and from said manifold to said conduit means; and, control means to rotate said tubular member.

2. In an agricultural apparatus for applying fluid to the soil, the combination comprising: a reservoir containing fluid; a pump; a conduit interconnecting said reservoir with the suction side of said pump; a manifold containing a main entrance port and a plurality of exit ports; a conduit connecting the delivery side of said pump with said main entrance port; a plurality of supply conduits, an individual supply conduit connected to an individual exit port of said manifold; a plurality of spray nozzles, an individual spray nozzle connected to an individual conduit; an elongated tubular member having ends and means closing said ends, said tubular member being movably supported within said manifold, said tubular member containing a plurality of passages, and being movable to block said entrance port that is connected to said delivery side of said pump and simultaneously block said exit ports to close said ports in said manifold to cut off the passage of said fluid from said pump into said manifold, and from said manifold to said supply conduits, or simultaneously open said ports in said manifold to permit passage of said fluid to said supply conduits; and, control means connected to said tubular member to move said tubular member to simultaneously align said passages with said port in said manifold to permit passage of said fluid or simultaneously close said ports to cut off passage of said fluid.

3. In an agricultural apparatus for applying fluid to the soil, said apparatus including vertically movable transport wheels and, a ram to raise and lower said transport wheels; the combination comprising: a reservoir containing fluid; a manifold; means for supplying fluid from said reservoir to said manifold; a plurality of nozzles; conduit means connecting said nozzles to said manifold; said manifold including valve means movable to cut off or permit the flow of fluid through said manifold to said conduit means; said valve means including an arm; and, control means interconnecting said ram and said arm to operate said valve means, said control means including a rod having one end connected to said arm and the other end pivotally connected to said ram; said ram moving said rod to move said ram of said valve means to automatically cut off or permit the flow of fluid in response to said ram raising or lowering said transport wheels.

4. A device as set forth in claim 3 wherein said manifold is provided with a projection that extends into the path of movement of said arm; and said control means includes a resilient connection between said rod and said arm; said valve means permitting the passage of fluid through said manifold to said spray nozzles when said arm engages said projection, and cutting off the flow of fluid from said manifold when said arm is moved out of engagement with said projection, and said resilient connection is constructed to yield to take up any additional movement of said rod after said arm engages said projection.

5. In an agricultural apparatus for applying fluid to the soil, the combination comprising: a reservoir containing fluid; a manifold having a main entrance port and a plurality of exit ports; means including a pump for supplying fluid from said reservoir to said main entrance port of said manifold; a plurality of nozzles; conduit means connecting said nozzles to said exit ports in said manifold; said manifold including valve means movable to block said main entrance port in said manifold and to simultaneously block said exit ports to close all of said ports in said manifold to cut off the passage of fluid into said manifold and from said manifold to said conduit means; control means to move said valve means; and, means to bypass the fluid supplied by said pump to said main entrance port back to said reservoir when said valve means blocks said main entrance port.

6. In an agricultural apparatus for applying fluid to the soil, said agricultural apparatus including vertically movable transport wheels, and a ram to raise and lower said transport wheels, the combination comprising: a reservoir containing fluid; a pump; a conduit interconnecting said reservoir with the suction side of said pump; a manifold containing a main entrance port and a plurality of exit ports; a conduit connecting the delivery side of said pump with said main entrance port; a plurality of supply conduits, an individual supply conduit connected to an individual exit port of said manifold; a plurality of spray nozzles, an individual spray nozzle connected to an individual conduit; said manifold including a tubular member, said tubular member containing a plurality of passages; an arm connected to said tubular member; control means including a rod having one end pivotally connected to said arm and the other end pivotally connected to said ram; said ram moving said rod to rotate said arm and said tubular member to simultaneously align said passages in said tubular member with said ports in said manifold to permit flow of fluid through said manifold or close off all of said ports to cut off said flow of fluid from said manifold to said nozzles.

7. A device as set forth in claim 6 wherein said manifold is provided with a projection extending in the path of movement of said arm; and a resilient connection interconnecting said rod to said arm; said tubular member being movable to align the passages in said tubular member with said ports in said manifold when said arm engages said projection, and movable to cut off the flow of fluid from said manifold when the arm is out of engagement with said projection, and said resilient connection is constructed to yield to take up any additional movement of said rod after said arm engages said projection.

8. In a planter for applying fluid to soil in which crops are grown, the combination comprising: a reservoir containing fluid; a pump; a first conduit interconnecting said reservoir with the suction side of said pump; a bypass valve; a second conduit connecting the delivery side of said pump with said bypass valve; said manifold containing a main entrance port and a plurality of exit ports; a third conduit branching off said second conduit and connected to said main entrance port in said manifold; a plurality of supply conduits, an individual supply conduit connected to an individual exit port of said manifold; a plurality of spray nozzles; an individual spray nozzle connected to an individual conduit; a fourth conduit interconnecting said bypass valve and said reservoir, said manifold including valve means movable to block said main entrance port in said manifold, and to simultaneously block said plurality of exit ports to close all of said ports in said manifold to cut off the passage of fluid into said manifold and from said manifold to said supply conduits, or open said ports in said manifold to simultaneously permit passage of said fluid to said supply conduits; control means connected to said valve means to operate said valve means; and, said bypass valve constructed to bypass the fluid supplied by said pump to said main entrance port back to said reservoir when said valve means blocks said main entrance port.

References Cited in the file of this patent
UNITED STATES PATENTS

| | | |
|---|---|---|
| 1,759,920 | Talbott | May 27, 1930 |
| 2,108,299 | Steffen | Feb. 15, 1938 |
| 2,655,405 | Lattner | Oct. 13, 1953 |
| 2,722,456 | Glessner | Nov. 1, 1955 |
| 2,800,365 | Hodges | July 23, 1957 |

UNITED STATES PATENT OFFICE
CERTIFICATE OF CORRECTION

Patent No. 3,044,712                                    July 17, 1962

Willard H. Tanke

It is hereby certified that error appears in the above numbered patent requiring correction and that the said Letters Patent should read as corrected below.

Column 5, line 66, for "ram" read -- arm --.

Signed and sealed this 20th day of November 1962.

(SEAL)
Attest:

ERNEST W. SWIDER                              DAVID L. LADD
Attesting Officer                                  Commissioner of Patents